US012198921B2

(12) United States Patent
Bezel et al.

(10) Patent No.: US 12,198,921 B2
(45) Date of Patent: Jan. 14, 2025

(54) LASER-SUSTAINED PLASMA LIGHT SOURCE WITH TAPERED WINDOW

(71) Applicant: KLA Corporation, Milpitas, CA (US)

(72) Inventors: Ilya Bezel, Mountain View, CA (US); Amir Torkaman, San Francisco, CA (US)

(73) Assignee: KLA Corporation, Milpitas, CA (US)

( * ) Notice: Subject to any disclaimer, the term of this patent is extended or adjusted under 35 U.S.C. 154(b) by 0 days.

(21) Appl. No.: 18/591,686

(22) Filed: Feb. 29, 2024

(65) Prior Publication Data

US 2024/0304435 A1 Sep. 12, 2024

Related U.S. Application Data

(60) Provisional application No. 63/451,049, filed on Mar. 9, 2023.

(51) Int. Cl.
*H01J 61/02* (2006.01)
*H01J 61/12* (2006.01)

(52) U.S. Cl.
CPC ............ *H01J 61/025* (2013.01); *H01J 61/12* (2013.01); *H01J 2893/0063* (2013.01)

(58) Field of Classification Search
CPC ... H01J 61/025; H01J 61/12; H01J 2893/0063
See application file for complete search history.

(56) References Cited

U.S. PATENT DOCUMENTS 5,608,526 A 3/1997 Piwonka-Corle et al.
5,999,310 A 12/1999 Shafer et al.
6,297,880 B1 10/2001 Rosencwaig et al.
7,525,649 B1 4/2009 Leong et al.
7,957,066 B2 6/2011 Armstrong et al.
10,770,282 B1 9/2020 Abramenko et al.
2007/0002465 A1 1/2007 Chuang et al.
2013/0114085 A1 5/2013 Wang et al.
2017/0315369 A1 11/2017 Shchemelinin et al.
2018/0114687 A1 4/2018 Chuang et al.
2019/0033204 A1 1/2019 Bezel et al.
2021/0331240 A1 10/2021 Boulos et al.
2024/0274430 A1 * 8/2024 Bezel ...................... H01J 61/40

OTHER PUBLICATIONS

Korean Intellectual Property Office, International Search Report and Written Opinion received in International Application No. PCT/US2024/018575, Jun. 25, 2024, 7 pages.

* cited by examiner

*Primary Examiner* — Donald L Raleigh
(74) *Attorney, Agent, or Firm* — Suiter Swantz IP

(57) ABSTRACT

A LSP broadband light source is disclosed. The light source may include a gas containment structure for containing a gas. The light source may include a laser pump source configured to generate an optical pump to sustain a plasma within the gas containment structure for generation of broadband light. The light source may include a tapered window configured to transmit broadband light through an aperture within a wall of the gas containment structure, the tapered window including a tapered section including a tapered surface, wherein the tapered surface is configured to deflect light impinging on a peripheral portion of the tapered window away from a portion of the gas containment structure to protect the portion of the gas containment structure.

29 Claims, 11 Drawing Sheets

LASER-SUSTAINED PLASMA LIGHT SOURCE WITH TAPERED WINDOW

CROSS-REFERENCE TO RELATED APPLICATION

The present application claims priority to U.S. Provisional Application Ser. No. 63/451,049, filed Mar. 9, 2023, which are incorporated herein by reference in their entirety.

TECHNICAL FIELD

The present disclosure generally relates to plasma-based radiation sources, and, more particularly, to a high-power vacuum ultraviolet (VUV) laser-sustained plasma (LSP) light source with a tapered window for deflecting broadband light away from seal regions.

BACKGROUND

Laser-sustained plasma (LSP) light sources are widely used in broadband inspection tools for use in semiconductor inspection and imaging. Generally, near-Infrared (NIR) Continuous Wave (CW) pump laser light is focused to a gas-containing vessel, where a plasma is ignited and sustained by absorption of the pump laser radiation. This vessel may be a lamp (e.g., glass bulb with or without electrodes used for plasma ignition), or a cell (e.g., optomechanical assembly with transparent walls to allow laser and plasma radiation in and out of the cell), or a chamber (e.g., metal vessel with transparent windows for laser light input and plasma light output), or similar assembly. The various plasma vessels have high internal pressure, which in operation reaches many tens or over a hundred atmospheres. This high-pressure gas contained in the vessel is crucial for LSP operation. The plasma light is collected through transparent walls or windows of the vessel and is used as an illumination source for inspection tools.

There have been various versions of such sources developed. Most of these sources are designed to operate in the Visible (VIS) or Ultra-Violet (UV) spectral regions. When these sources are used to generate light in the vacuum ultraviolet (VUV) spectral region, and especially in the range of approximately 125-150 nm, the choice of practical constructions is relatively small, and it is limited to relatively low pump powers. A typical source for generating VUV light includes a metal chamber with multiple windows which couple the laser light in and out of the chamber. While different materials can be used for the laser windows, few choices exist for VUV generation. The most widely used in MgF2, with the transmission cut-off wavelength of approximately 115 nm or $CaF_2$ with the transmission cut-off wavelength of approximately 125 nm.

One of the most significant limitations for operation of such a VUV source is that the construction of high-pressure windows for the use with LSP light sources encounters a trade-off between the practical window size and the amount of radiative heat load the window and the elements of the window seal must withstand. Currently, a window can be sealed on three different surfaces, which determine how close to the plasma the construction elements of window seals are located. As shown in FIGS. 1A-1C, the seals for the window can be located on the front, side, or back surface of the window as shown in views 10, 20, and 30 respectively. In each case, broadband light 14 impinges on the given window assembly 10, 20, 30. While a portion 18 of the broadband light 14 is transmitted through the center portion of the window 11, a portion 16 of the broadband light impinges on one or more portions of the window assembly such as the seals 113. Due to the radiative heat load on the seals 113, the seals 113 degrade over time. FIG. 2 depicts a cross-section view 40 showing the pathways of portions of the broadband light in greater detail.

As shown, previous methods of construction result in direct irradiation of the seals or construction elements by plasma light for windows placed in close proximity to a high-power plasma light source, resulting in high thermal loads on the seal and/or seal construction elements, cooling of which becomes a limiting factor in window performance. Therefore, it would be desirable to provide an LSP broadband light source that overcomes the limitations outlined above.

SUMMARY

A laser-sustained plasma (LSP) broadband light source is disclosed. In some aspects the LSP broadband light source includes a gas containment structure for containing a gas; a laser pump source configured to generate an optical pump, wherein the laser pump source is configured to direct the optical pump into the gas containment structure to sustain a plasma within the gas containment structure, wherein the plasma generates broadband light; and a window configured to transmit broadband light through an aperture within a wall of the gas containment structure, the window including a tapered section including a tapered surface, wherein the tapered surface is configured to deflect a portion of light impinging on a peripheral portion of the window away from the of the gas containment structure to protect one or more portions of the gas containment structure.

A semiconductor characterization system is disclosed. In some aspects, the characterization system includes a broadband light source. The broadband light source includes a gas containment structure for containing a gas; a laser pump source configured to generate an optical pump, wherein the laser pump source is configured to direct the optical pump into the gas containment structure to sustain a plasma within the gas containment structure, wherein the plasma generates broadband light; and a window configured to transmit broadband light through an aperture of the gas containment structure, the output optical window including a tapered section including a tapered surface, wherein the tapered surface is configured to deflect a portion of light impinging on a peripheral portion of the window away from the aperture of the gas containment structure to protect one or more portions of the gas containment structure. In some aspects, the characterization system further includes a set of illumination optics configured to direct broadband light from the broadband light source to one or more samples; a set of collection optics configured to collect light emanating from the one or more samples; and a detector assembly.

A method of generating VUV broadband light is disclosed. In some aspects, the method includes containing a gas within a gas containment structure; generating an optical pump and directing the optical pump into the gas containment structure to sustain a plasma within the gas containment structure to generate broadband light; deflecting a portion of broadband light impinging on a peripheral portion of a window away from an aperture within the wall of the gas containment structure to protect one or more portions of the gas containment structure; and transmitting broadband light impinging on a center portion of the window through the aperture within the wall of the gas containment structure via the center portion of window. In some aspects, a laser-sustained broadband light source including: a gas containment structure for containing a gas; a laser pump source configured to generate an optical pump, wherein the laser pump source is configured to direct the optical pump into the gas containment structure to sustain a plasma within the gas containment structure, wherein the plasma generates broadband light; and a window configured to transmit broadband light through an aperture within a wall of the gas containment structure, the window including a tapered section including a tapered surface, wherein the tapered surface is configured to deflect a portion of light impinging on a peripheral portion of the window away from the of the gas containment structure to protect one or more portions of the gas containment structure.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures.

DETAILED DESCRIPTION

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Referring generally to FIGS. 1A-7, a laser-sustained plasma broadband light source with a tapered window for deflecting light from selected portions of the plasma chamber is described, in accordance with one or more embodiments of the present disclosure.

Embodiments of the present disclosure are directed to an LSP broadband source equipped with one or more tapered windows configured for deflecting broadband light away from one or more portions of the chamber used to generate the plasma source. For example, embodiments of the present disclosure may include a tapered window (e.g., polished tapered conical surface) arranged to deflect broadband light emitted by a plasma away from one or more seals forming a seal between the window and the wall of the chamber.

Figure 1A:
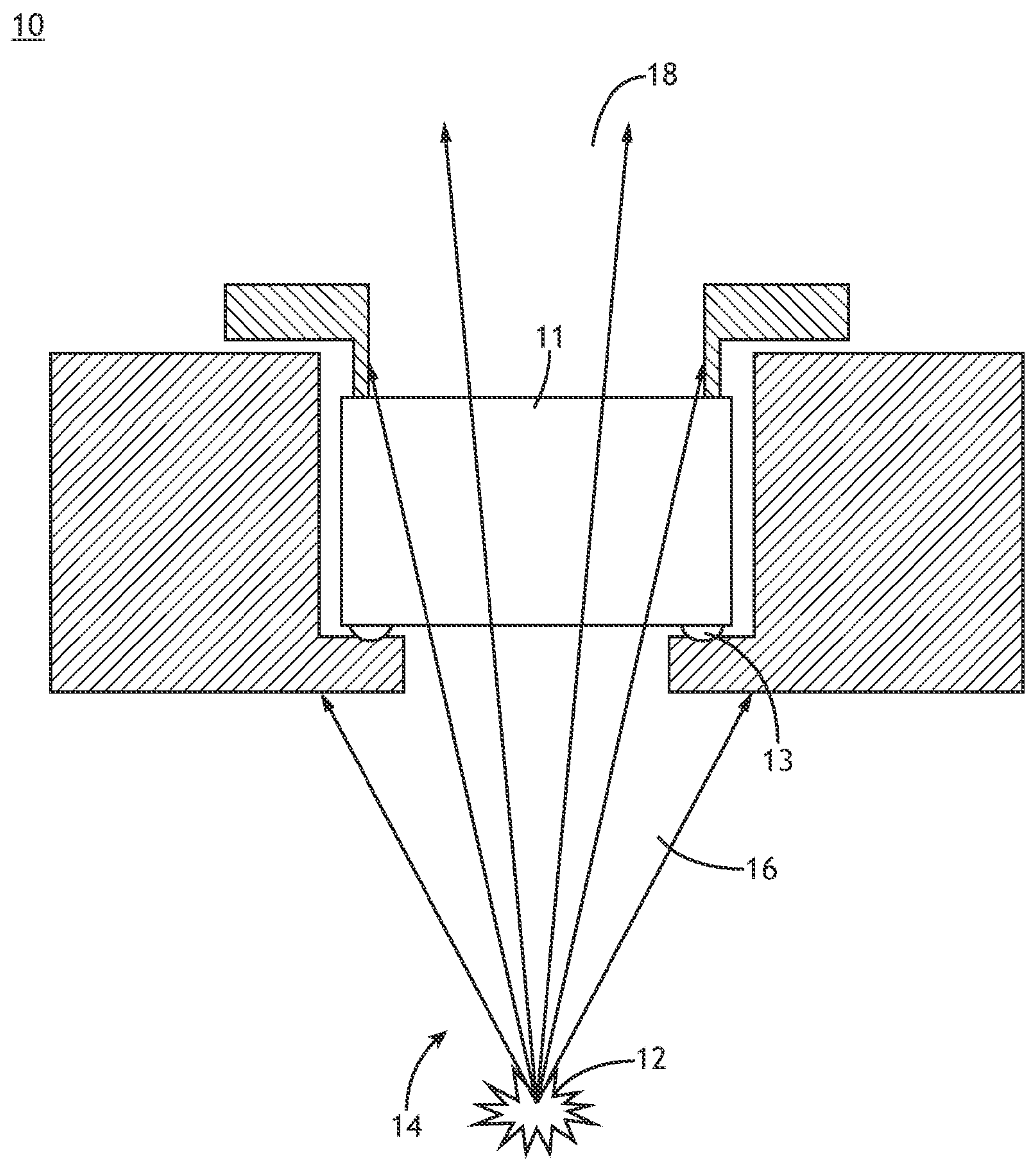
FIGS. 1A-1C illustrate approaches to sealing windows in a high-pressure LSP broadband light source.
Figure 1B:
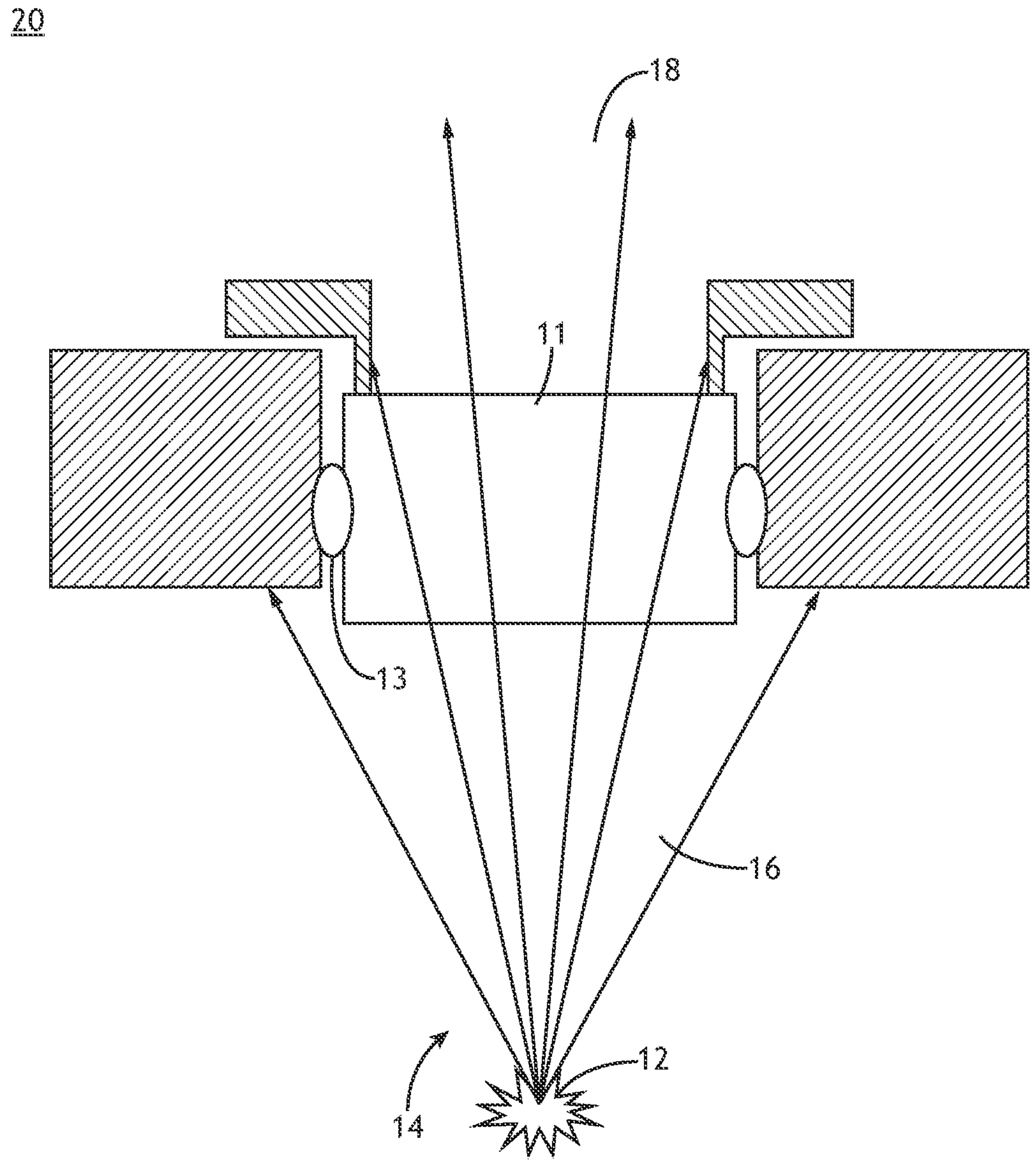
Figure 1C:
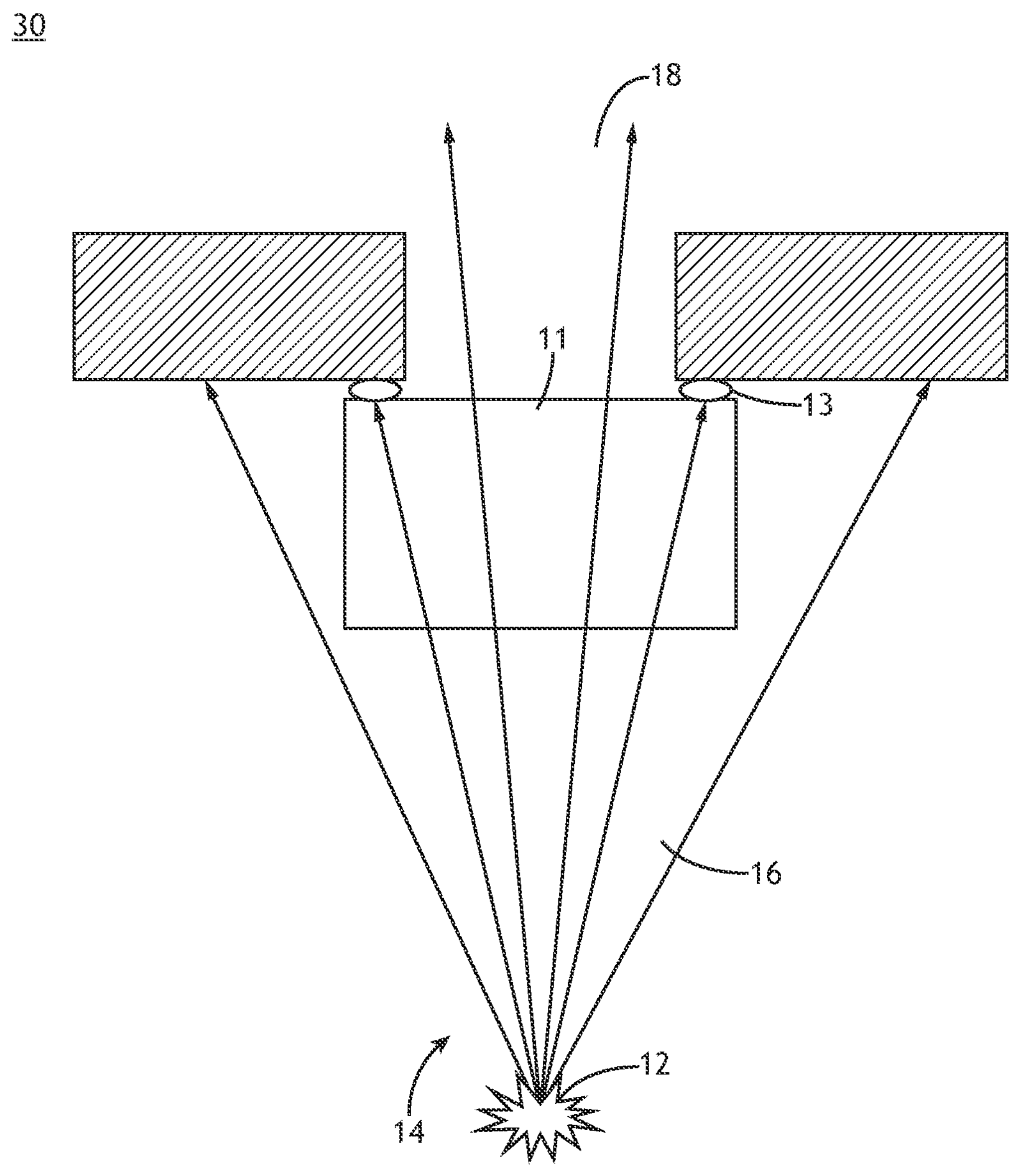
Figure 2:
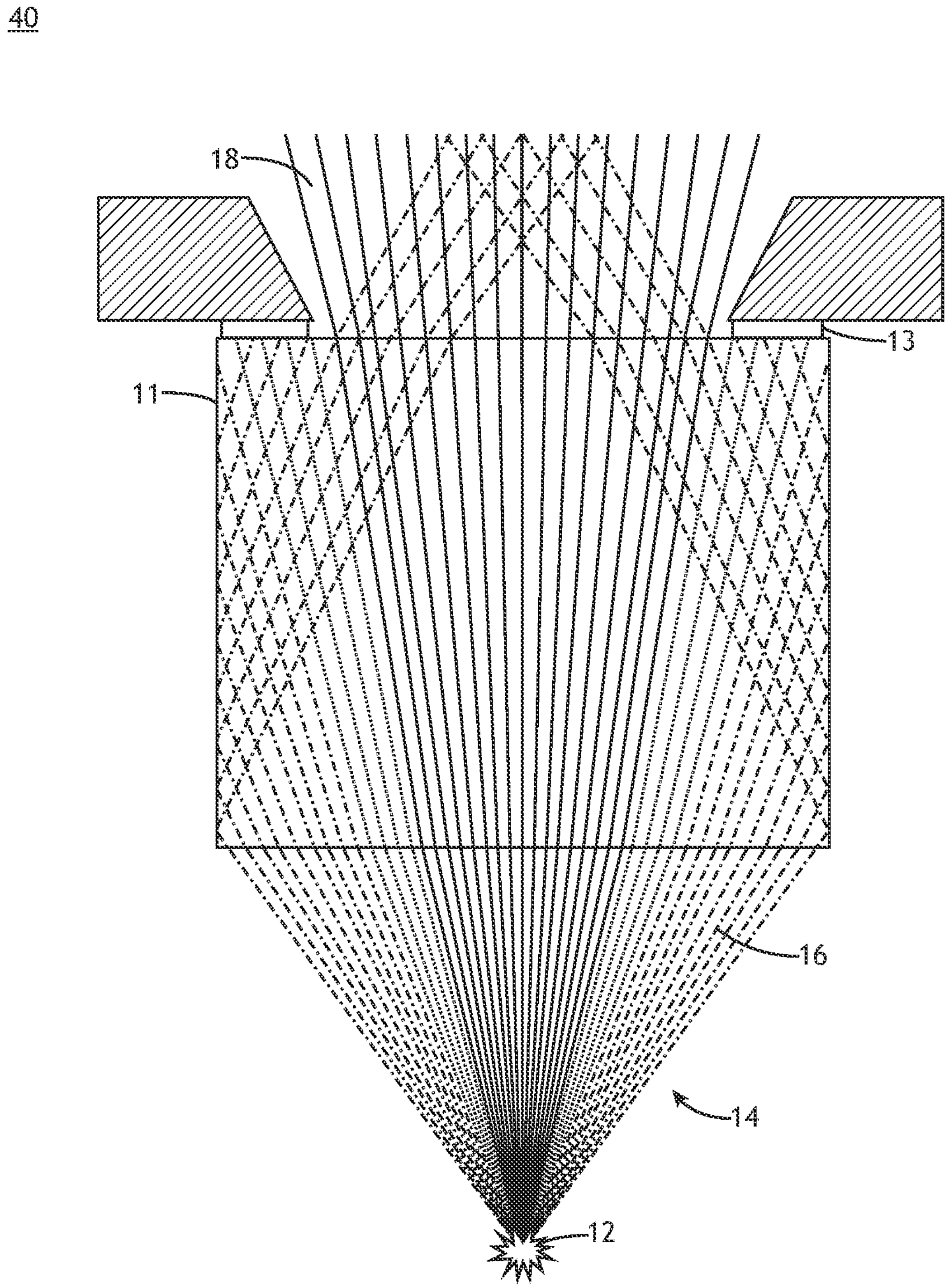
FIG. 2 illustrates a cross-section view of an approach to sealing a window in a high-pressure LSP broadband light source.
Figure 3:
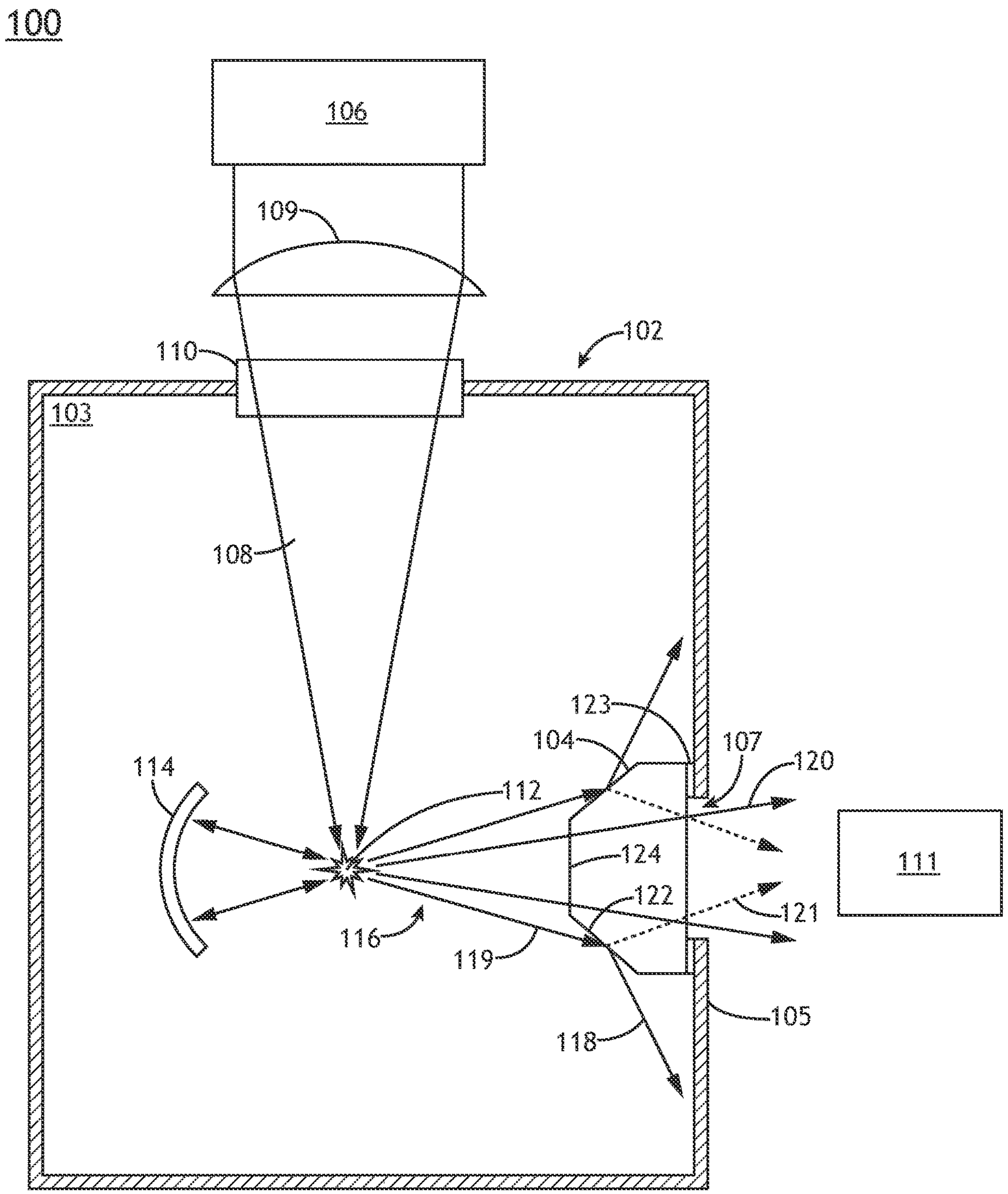
FIG. 3 illustrates a simplified schematic view of an LSP broadband light source with a tapered window, in accordance with one or more embodiments of the present disclosure.

FIG. 3 illustrates a simplified schematic view of a LSP broadband light source 100 with one or more tapered windows, in accordance with one or more embodiments. In embodiments, the light source 100 includes a gas containment structure 102 containing one or more gases 103. For example, the gas containment structure 102 may contain one or more high-pressure gases (e.g., 50-300 atm). In embodiments, the light source 100 includes a tapered window 104 configured to transmit broadband light through an aperture 107 within a wall 105 of the gas containment structure 102. In embodiments, the tapered window 104 includes a tapered section including a tapered surface 122. The tapered surface 122 may be configured to deflect a portion 118 of light impinging on a peripheral portion of the tapered window 104 away from the of the gas containment structure 102 to protect one or more portions 123 of the gas containment structure 102. For example, the tapered window 104 may be configured to deflect illumination 118 away from one or more seals 123. In embodiments, the tapered window 104 may transmit some illumination 120 passing through a central face 124 of the window 104 and through the aperture 107 while avoiding the one or more seals 123. In embodiments, the tapered surface 122 of the tapered window 104 may internally reflect some illumination 121 such that illumination 121 passes through aperture 107 and avoids one or more seals 123. In embodiments, the illumination 120, 121 passed through the aperture 107 is transmitted to one or more downstream optics 111.

The tapered window may be used as an input or output window. While the present disclosure has depicted the window 104 as an output window, this configuration should not be interpreted as a limitation on the scope of the present disclosure and in other embodiments the window may be used as an input window. For example, window 110 may be replaced by window 104.

In embodiments, the light source 100 includes a laser pump source 106 configured to generate an optical pump 108. The laser pump source 106 is configured to direct the optical pump 108 into the gas containment structure 102 to sustain a plasma 112 within the gas containment structure 102 to generate broadband light 116. For example, the laser pump source 106 and focusing lens 109 may direct and focus the optical pump 108 into the gas containment structure 102 through window 110 to sustain plasma 112.

The laser pump source 106 may include any laser known in the art of plasma-based broadband light generation. In embodiments, the laser pump source 106 may include one or more continuous wave (CW) pump lasers and/or one or more pulsed lasers. The laser pump source 106 may be configured to emit infrared (IR) radiation, near infrared (NIR) radiation, ultraviolet (UV) radiation, visible radiation, or other radiation suitable to form a plasma when incident on a suitable target material.

In embodiments, the light source 100 includes one or more collection optics 114. For example, the one or more collection optics may include one or more mirrors and/or one or more lenses. For example, as shown in FIG. 3, the one or more collection optics 114 may include a retroflector configured to collect broadband light 116 from plasma 112 and redirecting the illumination toward the aperture 107 and through the tapered window 104.

The gas contained within the gas containment structure 102 an used to generate plasma 112 may include any gas or mixture of gases suitable for used in broadband generation via laser-sustained plasma sources. For example, the one or more gases may include, but are not limited to, Ar, Xe, Kr, Ne, or He or a mixture of two or more of Ar, Xe, Kr, Ne, or He.

The broadband source 100 may be configured to emit broadband light in one or more of the spectral ranges including UV light, VUV light, and/or DUV light.

Figure 4A:
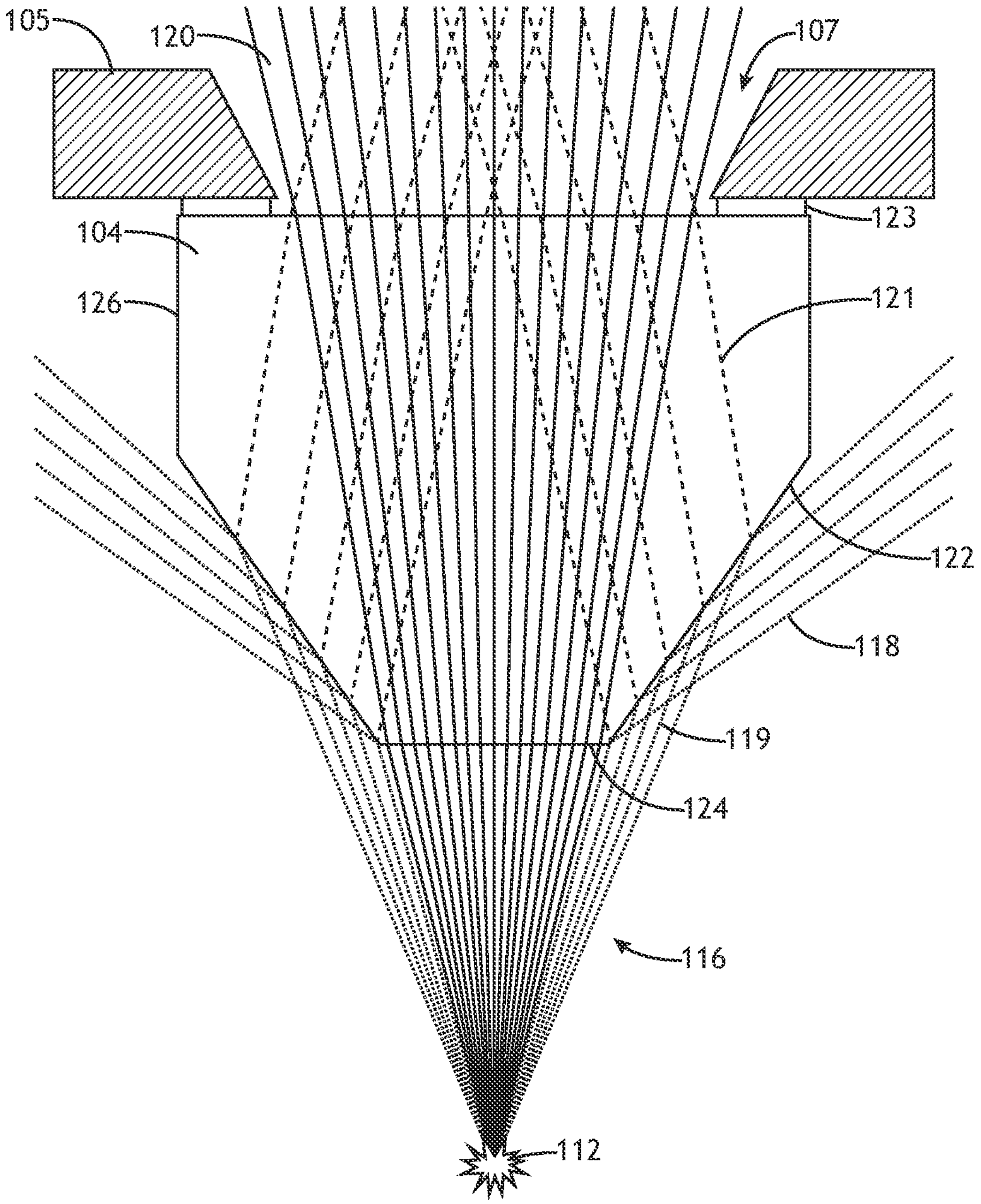
FIG. 4A illustrates a cross-section view of a tapered window within a high-pressure LSP broadband light source, in accordance with one or more embodiments of the present disclosure.

FIG. 4A illustrates a cross-sectional view of the tapered window 104, in accordance with one or more embodiments of the present disclosure. The broadband light 116 may impinge the tapered window 104. A central portion 120 of the illumination 116 may pass through the front face 124 of the tapered window 104 and pass through the aperture 107 of wall 105 without impinging on the one or more seals 123. A peripheral portion of the illumination 116 may impinge the tapered surface 122 of the tapered window 104. A first portion 118 of the light impinging on the tapered surface 122 may be deflected away from the tapered window 104 and away from the one or more seals 123. A second portion 121 of the light impinging on the tapered surface 121 may be internally reflected through the bulk of the tapered window 104 and through the aperture 107 of the wall 105 while avoiding the one or more seals 123.

In embodiments, the tapered surface 122 of the tapered window 104 may be polished to reflect a portion 119 of broadband light impinging on the peripheral portion of the window 104 away from the aperture 107 in the wall 105 of the gas containment structure 102 to protect one or more portions of the gas containment structure 102. In embodiments, the tapered surface 122 includes a ground tapered surface configured to scatter a portion 119 of light impinging on the peripheral portion of the window 124 away from the aperture 107 in the wall 105 of the gas containment structure 102 to protect one or more portions of the gas containment structure 102.

The tapered window 104 may be formed from any optical material known in the art suitable for operating in high-pressure VUV light sources. For example, the tapered window 104 may be formed from, but is not limited to, MgF2, CaF2, LiF, sapphire, quartz, and the like.

Figure 4B:
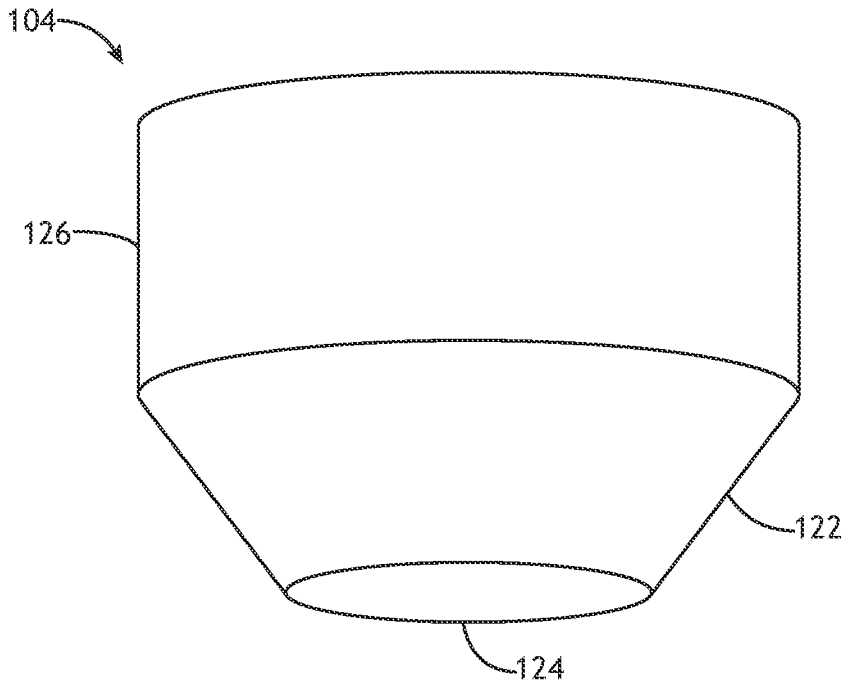
FIG. 4B illustrates a simplified schematic view of a tapered window within a high-pressure LSP broadband light source, in accordance with one or more embodiments of the present disclosure.

FIG. 4B illustrates a simplified schematic view of the tapered window 104, in accordance with one or more embodiments of the present disclosure. The tapered window 104 may be formed as a monolithic structure having a tapered cylindrical shape. For example, the tapered window 104 may include a cylindrical body 126, the tapered surface 122, and the face 124. In embodiments, the tapered surface 122 includes a conical surface. The conical surface may include one or more conical sections. It is noted that the scope of the present disclosure is not limited to the conical structure depicted in FIG. 4B which is provided merely for illustrative purposes.

Figure 5A:
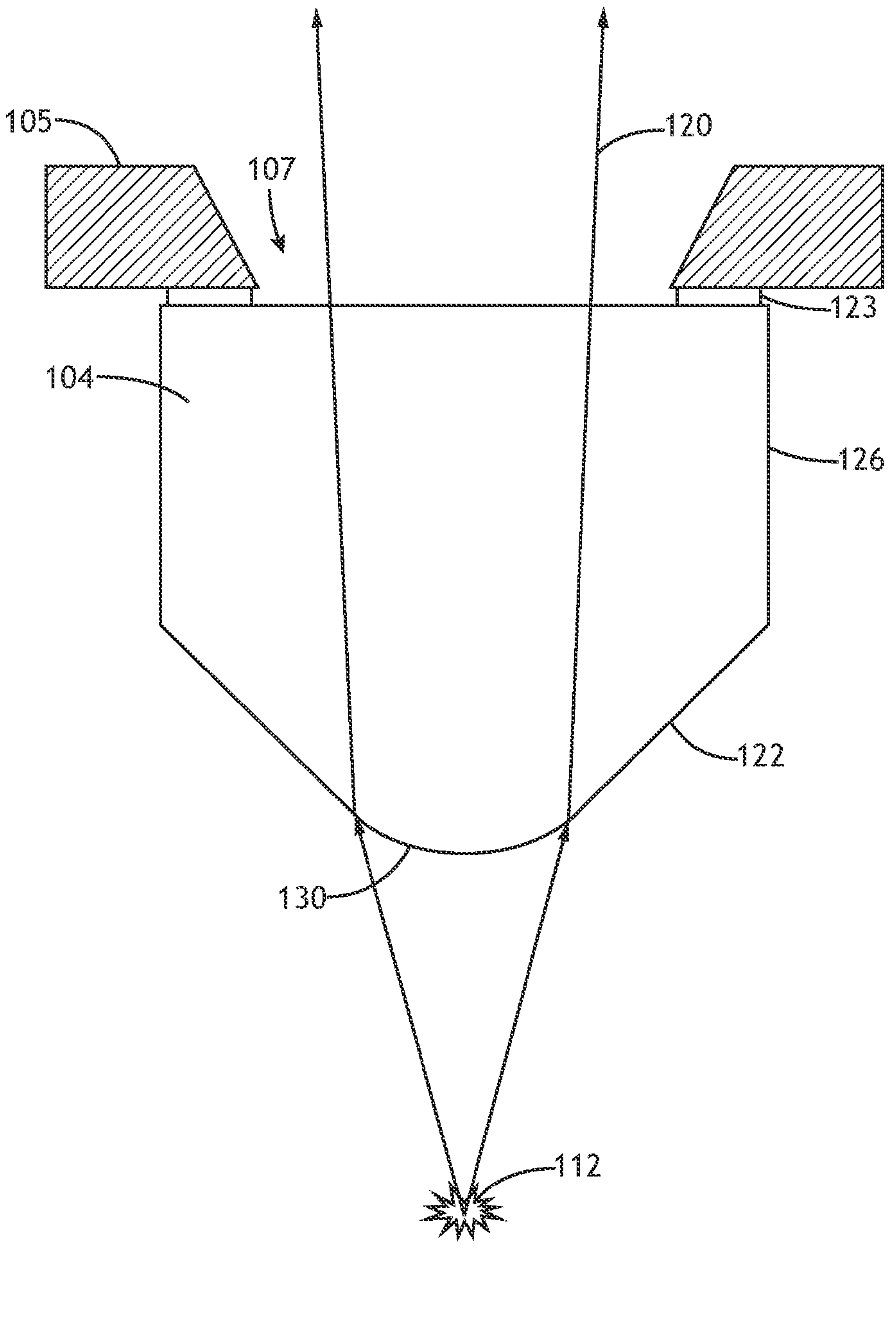
FIG. 5A illustrates a cross-section view of a tapered window with a convex surface for collimating light transmitted through the tapered window, in accordance with one or more embodiments of the present disclosure.
Figure 5B:
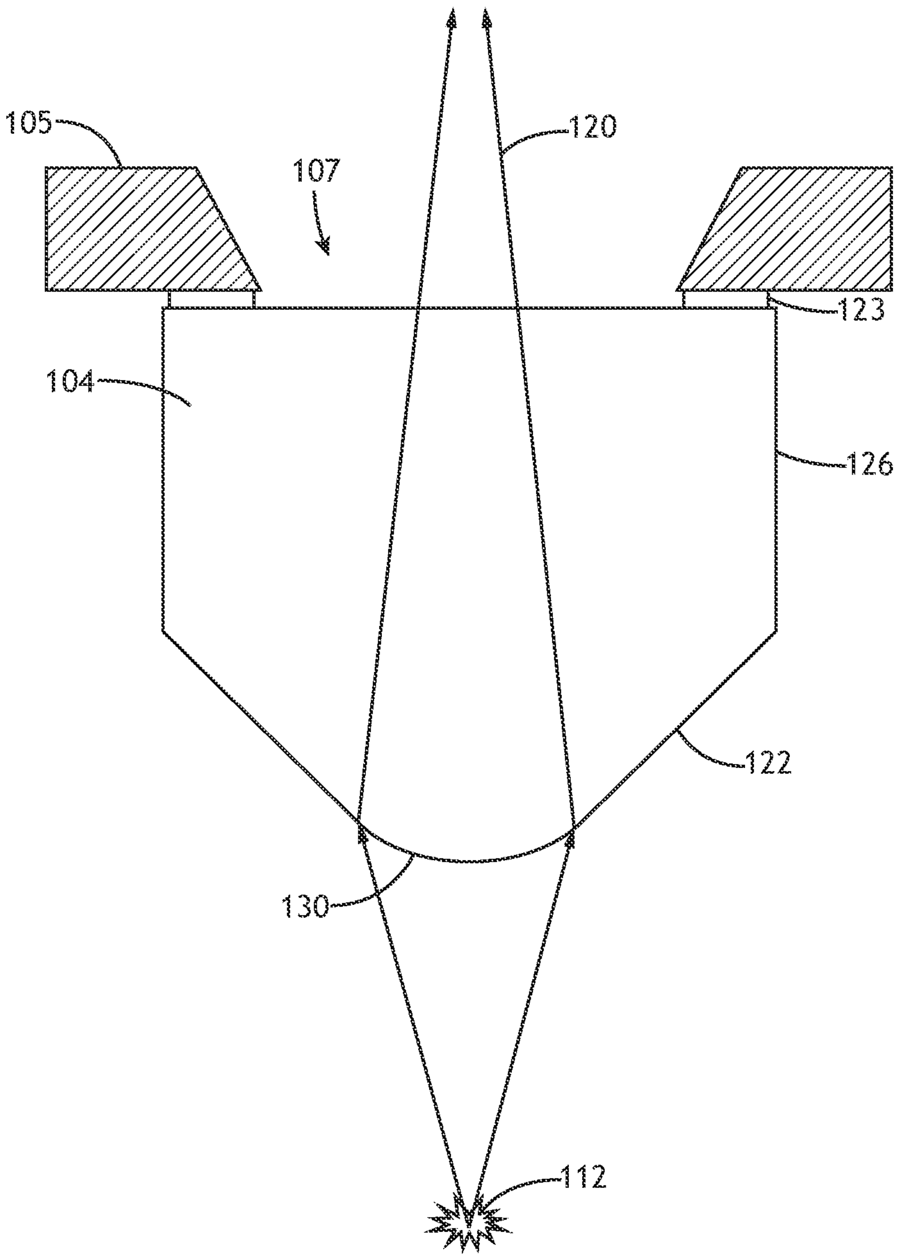
FIG. 5B illustrates a cross-section view of a tapered window with a convex surface for focusing light transmitted through the tapered window, in accordance with one or more embodiments of the present disclosure.

FIGS. 5A-5B illustrate simplified schematic view of the the tapered window 104 with a convex lensing surface, in accordance with one or more embodiments of the present disclosure. In embodiments, the convex lensing surface 130 may be formed at the center portion of the tapered window 104. For example, as shown in FIG. 5A, the convex lensing surface 130 may be configured to collimate light impinging on the convex lensing surface 130 of the tapered window 104. By way of another example, as shown in FIG. 5B, the convex lensing surface 130 may be configured to focus light impinging on the convex lensing surface 130 of the tapered window 104. The convex lensing surface 130 may include, but is not limited to, a spherical lensing surface. The surface of the tapered window 104 may be modified to condition the broadband light in a desired manner. For example, the tapered window 104 may include a lensing surface or a filtering surface.

Figure 6:
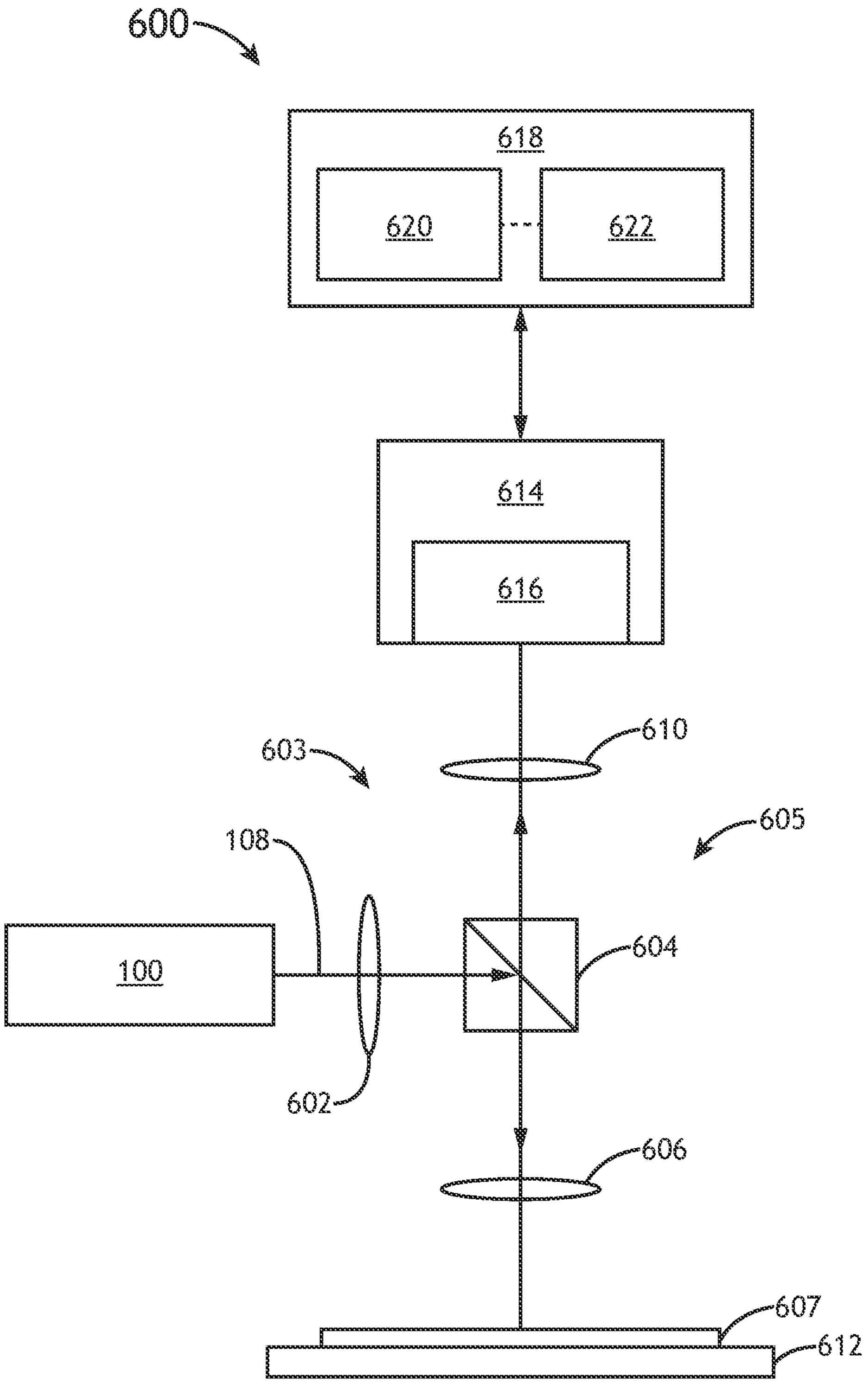
FIG. 6 illustrates a simplified schematic view of a characterization system incorporating the LSP broadband light source, in accordance with one or more alternative and/or additional embodiments of the present disclosure.

FIG. 6 illustrates a simplified schematic view of an optical characterization system 600 incorporating the compact LSP broadband light source, in accordance with one or more alternative and/or additional embodiments. In embodiments, system 600 includes the LSP light source 100, an illumination arm 603, a collection arm 605, a detector assembly 614, and a controller 618 including one or more processors 620 and memory 622.

It is noted herein that system 600 may comprise any imaging, inspection, metrology, lithography, or other characterization system known in the art. In this regard, system 600 may be configured to perform inspection, optical metrology, lithography, and/or any form of imaging on a sample 607. Sample 607 may include any sample known in the art including, but not limited to, a wafer, a reticle, a photomask, and the like. It is noted that system 600 may incorporate one or more of the various embodiments of the LSP light source 100 described throughout the present disclosure.

In one embodiment, sample 607 is disposed on a stage assembly 612 to facilitate movement of sample 607. Stage assembly 612 may include any stage assembly 612 known in the art including, but not limited to, an X-Y stage, an R-e stage, and the like. In another embodiment, stage assembly 612 is capable of adjusting the height of sample 607 during inspection or imaging to maintain focus on sample 607.

In one embodiment, the illumination arm 603 is configured to direct broadband light 117 from the Broadband LSP light source 100 to the sample 607. The illumination arm 603 may include any number and type of optical components known in the art. In one embodiment, the illumination arm 603 includes one or more optical elements 602, a beam splitter 604, and an objective lens 606. In this regard, illumination arm 603 may be configured to focus broadband light 117 from the Broadband LSP light source 100 onto the surface of the sample 607. The one or more optical elements 602 may include any optical element or combination of optical elements known in the art including, but not limited to, one or more mirrors, one or more lenses, one or more polarizers, one or more gratings, one or more filters, one or more beam splitters, and the like. It is noted herein that the collection location may include, but is not limited to, one or more of the optical elements 602, a beam splitter 604, or an objective lens 606.

In one embodiment, system 600 includes a collection arm 605 configured to collect light reflected, scattered, diffracted, and/or emitted from sample 607. In another embodiment, collection arm 605 may direct and/or focus the light from the sample 607 to a sensor 616 of a detector assembly 614. It is noted that sensor 616 and detector assembly 614 may include any sensor and detector assembly known in the art. The sensor 616 may include, but is not limited to, a CCD sensor or a CCD-TDI sensor. Further, sensor 616 may include, but is not limited to, a line sensor or an electron-bombardment line sensor.

In one embodiment, detector assembly 614 is communicatively coupled to a controller 618 including one or more processors 620 and memory 622. For example, the one or more processors 620 may be communicatively coupled to memory 622, wherein the one or more processors 620 are configured to execute a set of program instructions stored on memory 622. In one embodiment, the one or more processors 620 are configured to analyze the output of detector assembly 614. In one embodiment, the set of program instructions are configured to cause the one or more processors 620 to analyze one or more characteristics of sample 607. In another embodiment, the set of program instructions are configured to cause the one or more processors 620 to modify one or more characteristics of system 600 in order to maintain focus on the sample 607 and/or the sensor 616. For example, the one or more processors 620 may be configured to adjust the objective lens 606 or one or more optical elements 602 in order to focus broadband light 117 from broadband LSP light source 100 onto the surface of the sample 607. By way of another example, the one or more processors 620 may be configured to adjust the objective lens 606 and/or one or more optical elements 610 in order to collect illumination from the surface of the sample 607 and focus the collected illumination on the sensor 616.

It is noted that the system 600 may be configured in any optical configuration known in the art including, but not limited to, a dark-field configuration, a bright-field orientation, and the like. The system 600 may be configured as any type of metrology tool known in the art such as, but not limited to, a spectroscopic ellipsometer with one or more angles of illumination, a spectroscopic ellipsometer for measuring Mueller matrix elements (e.g., using rotating compensators), a single-wavelength ellipsometer, an angle-resolved ellipsometer (e.g., a beam-profile ellipsometer), a spectroscopic reflectometer, a single-wavelength reflectometer, an angle-resolved reflectometer (e.g., a beam-profile reflectometer), an imaging system, a pupil imaging system, a spectral imaging system, or a scatterometer.

Additional details of various embodiments of optical characterization system 600 are described in U.S. Published U.S. Pat. No. 7,957,066B2, entitled "Split Field Inspection System Using Small Catadioptric Objectives," issued on Jun. 7, 2011; U.S. Published Patent Application 2007/0002465, entitled "Beam Delivery System for Laser Dark-Field Illumination in a Catadioptric Optical System," published on Jan. 4, 2007; U.S. Pat. No. 5,999,310, entitled "Ultra-broadband UV Microscope Imaging System with Wide Range Zoom Capability," issued on Dec. 7, 1999; U.S. Pat. No. 7,525,649 entitled "Surface Inspection System Using Laser Line Illumination with Two Dimensional Imaging," issued on Apr. 28, 2009; U.S. Published Patent Application 2013/0114085, entitled "Dynamically Adjustable Semiconductor Metrology System," by Wang et al. and published on May 9, 2013; U.S. Pat. No. 5,608,526, entitled "Focused Beam Spectroscopic Ellipsometry Method and System, by Piwonka-Corle et al., issued on Mar. 4, 1997; and U.S. Pat. No. 6,297,880, entitled "Apparatus for Analyzing Multi-Layer Thin Film Stacks on Semiconductors," by Rosencwaig et al., issued on Oct. 2, 2001, which are each incorporated herein by reference in their entirety.

The one or more processors 620 of the present disclosure may include any one or more processing elements known in the art. In this sense, the one or more processors 620 may include any microprocessor-type device configured to execute software algorithms and/or instructions. In one embodiment, the one or more processors 620 may consist of a desktop computer, mainframe computer system, workstation, image computer, parallel processor, or other computer system (e.g., networked computer) configured to execute a program configured to operate the system 600 and/or Broadband LSP light source 100, as described throughout the present disclosure. It should be recognized that the steps described throughout the present disclosure may be carried out by a single computer system or, alternatively, multiple computer systems. In general, the term "processor" may be broadly defined to encompass any device having one or more processing elements, which execute program instructions from a non transitory memory medium 622. Moreover, different subsystems of the various systems disclosed may include processor or logic elements suitable for carrying out at least a portion of the steps described throughout the present disclosure. Therefore, the above description should not be interpreted as a limitation on the present disclosure but merely an illustration.

The memory medium 622 may include any storage medium known in the art suitable for storing program instructions executable by the associated one or more processors 620. For example, the memory medium 622 may include a non-transitory memory medium. For instance, the memory medium 622 may include, but is not limited to, a read-only memory, a random access memory, a magnetic or optical memory device (e.g., disk), a magnetic tape, a solid state drive, and the like. In another embodiment, the memory 622 is configured to store one or more results and/or outputs of the various steps described herein. It is further noted that memory 622 may be housed in a common controller housing with the one or more processors 620. In an alternative embodiment, the memory 622 may be located remotely with respect to the physical location of the processors 620. For instance, the one or more processors 620 may access a remote memory (e.g., server), accessible through a network (e.g., internet, intranet, and the like). In another embodiment, memory medium 622 maintains program instructions for causing the one or more processors 620 to carry out the various steps described through the present disclosure.

Figure 7:
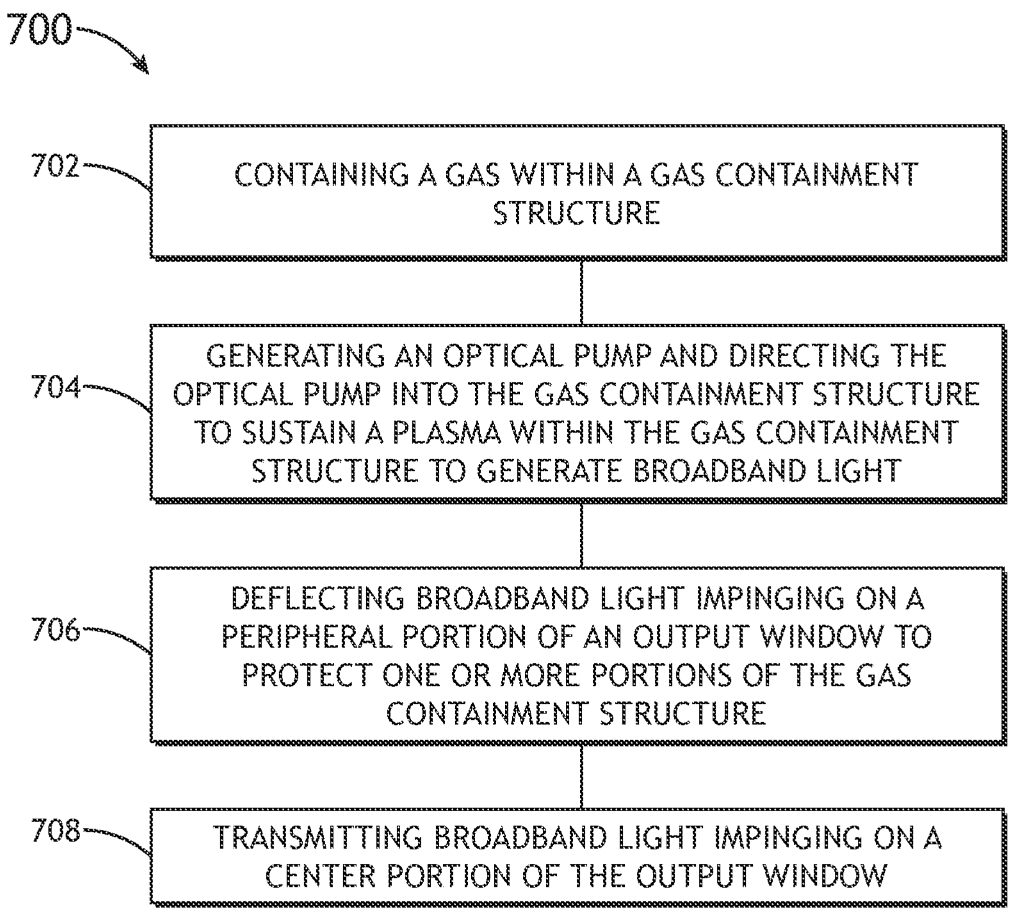
FIG. 7 illustrates a process flow diagram depicting a method of generating VUV light with the LSP broadband light source with deflection of broadband light away from portions of a window, in accordance with one or more embodiments of the present disclosure.

FIG. 7 illustrates a process flow diagram depicting a method 700 generating VUV light with an LSP broadband light source with a taped window, in accordance with one or more alternative and/or additional embodiments. It is noted herein that the steps of method 700 may be implemented all or in part by broadband LSP light source 100. It is further recognized, however, that the method 700 is not limited to the broadband LSP light source 100 in that additional or alternative system-level embodiments may carry out all or part of the steps of method 700.

In step 702, method 700 includes containing a gas within a gas containment structure. In step 704, method 700 includes generating an optical pump and directing the optical pump within the gas containment structure to sustain a plasma within the gas containment structure to generate broadband light. In step 706, method 700 includes deflecting a portion of broadband light impinging on a peripheral portion of a window away from an aperture within the wall of the gas containment structure to protect one or more portions of the gas containment structure. In step 708, the method includes transmitting broadband light impinging on a center portion of the window through the aperture within the wall of the gas containment structure via the center portion of window.

One skilled in the art will recognize that the herein described components, operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

The invention claimed is:

1. A laser-sustained plasma broadband light source comprising:

a gas containment structure for containing a gas;

a laser pump source configured to generate an optical pump, wherein the laser pump source is configured to direct the optical pump into the gas containment structure to sustain a plasma within the gas containment structure, wherein the plasma generates broadband light; and a window configured to transmit a portion of the broadband light through an aperture within a wall of the gas containment structure, the window including a tapered section including a tapered surface, wherein the tapered surface is configured to deflect a portion of broadband light impinging on a peripheral portion of the window away from the of one or more portions of the gas containment structure to protect the one or more portions of the gas containment structure.

2. The broadband light source of claim 1, wherein the window comprises a cylindrical window having the tapered section.

3. The broadband light source of claim 1, wherein the tapered section comprises a conical section.

4. The broadband light source of claim 1, wherein the tapered surface is configured to deflect a portion of broadband light impinging on the peripheral portion of the window away from one or more seals of the gas containment structure.

5. The broadband light source of claim 1, wherein the tapered surface is configured to transmit a portion of broadband light impinging on the peripheral portion of the window through the aperture of the gas containment structure.

6. The broadband light source of claim 1, wherein a center portion of the window is configured to transmit broadband light impinging on the center portion of the window through the aperture.

7. The broadband light source of claim 1, wherein the tapered surface comprises a polished tapered surface configured to reflect a portion of broadband light impinging on the peripheral portion of the window away from the aperture in the wall of the gas containment structure to protect one or more portions of the gas containment structure.

8. The broadband light source of claim 1, wherein the tapered surface comprises a ground tapered surface configured to scatter a portion of broadband light impinging on the peripheral portion of the window away from the aperture in the wall of the gas containment structure to protect one or more portions of the gas containment structure.

9. The broadband light source of claim 1, wherein the window includes a convex lensing surface at a center portion of the window, wherein the convex lensing surface is configured to collimate or focus broadband light impinging on the center portion of the window.

10. The broadband light source of claim 9, wherein the convex lensing surface comprises a spherical lensing surface.

11. The broadband light source of claim 1, wherein the window is formed from at least one of $MgF_2$, $CaF_2$, or LiF.

12. The broadband light source of claim 1, wherein the window comprises at least one of an output window or an input window.

13. The broadband light source of claim 1, wherein a pressure of the gas within the gas containment structure is between 50 and 300 atm.

14. The broadband light source of claim 1, wherein the broadband light transmitted through the window comprises at least vacuum ultraviolet light.

15. A characterization system comprising:

a broadband light source comprising:

a gas containment structure for containing a gas;

a laser pump source configured to generate an optical pump, wherein the laser pump source is configured to direct the optical pump into the gas containment structure to sustain a plasma within the gas containment structure, wherein the plasma generates broadband light; and a window configured to transmit a portion of the broadband light through an aperture of the gas containment structure, the window including a tapered section including a tapered surface, wherein the tapered surface is configured to deflect a portion of light impinging on a peripheral portion of the window away from the aperture of the gas containment structure to protect one or more portions of the gas containment structure;

a set of illumination optics configured to direct broadband light from the broadband light source to one or more samples;

a set of collection optics configured to collect light emanating from the one or more samples; and a detector assembly.

16. The characterization system of claim 15, wherein the window comprises a cylindrical window having the tapered section.

17. The characterization system of claim 15, wherein the tapered section comprises a conical section.

18. The characterization system of claim 15, wherein the tapered surface is configured to deflect a portion of broadband light impinging on the peripheral portion of the window away from one or more seals of the gas containment structure.

19. The characterization system of claim 15, wherein the tapered surface is configured to transmit a portion of broadband light impinging on the peripheral portion of the window through the aperture of the gas containment structure.

20. The characterization system of claim 15, wherein a center portion of the window is configured to transmit broadband light impinging on the center portion of the window through the aperture.

21. The characterization system of claim 15, wherein the tapered surface comprises a polished tapered surface configured to reflect a portion of broadband light impinging on the peripheral portion of the window away from the aperture in a wall of the gas containment structure to protect one or more portions of the gas containment structure.

22. The characterization system of claim 15, wherein the tapered surface comprises a ground tapered surface configured to scatter a portion of broadband light impinging on the peripheral portion of the window away from the aperture in a wall of the gas containment structure to protect one or more portions of the gas containment structure.

23. The characterization system of claim 15, wherein the optical window includes a convex lensing surface at a center portion of the optical window, wherein the convex lensing surface is configured to collimate or focus broadband light impinging on a center portion of the optical window.

24. The characterization system of claim 23, wherein the convex lensing surface comprises a spherical lensing surface.

25. The characterization system of claim 15, wherein the window is formed from at least one of $MgF_2$, $CaF_2$, or LiF.

26. The characterization system of claim 15, wherein the window comprises at least one of an output window or an input window.

27. The characterization system of claim 15, wherein a pressure of the gas within the gas containment structure is between 50 and 300 atm.

28. The characterization system of claim 15, wherein the broadband light transmitted through the window comprises at least vacuum ultraviolet light.

29. A method of generating VUV broadband light comprising:

containing a gas within a gas containment structure;

generating an optical pump and directing the optical pump into the gas containment structure to sustain a plasma within the gas containment structure to generate broadband light;

deflecting a portion of broadband light impinging on a peripheral portion of a window away from an aperture within a wall of the gas containment structure to protect one or more portions of the gas containment structure; and transmitting broadband light impinging on a center portion of the window through the aperture within a wall of the gas containment structure via the center portion of window.

* * * * *